Feb. 16, 1943.　　R. C. PIERCE　　2,310,991
ANNEALING APPARATUS
Filed March 8, 1940　　6 Sheets-Sheet 1
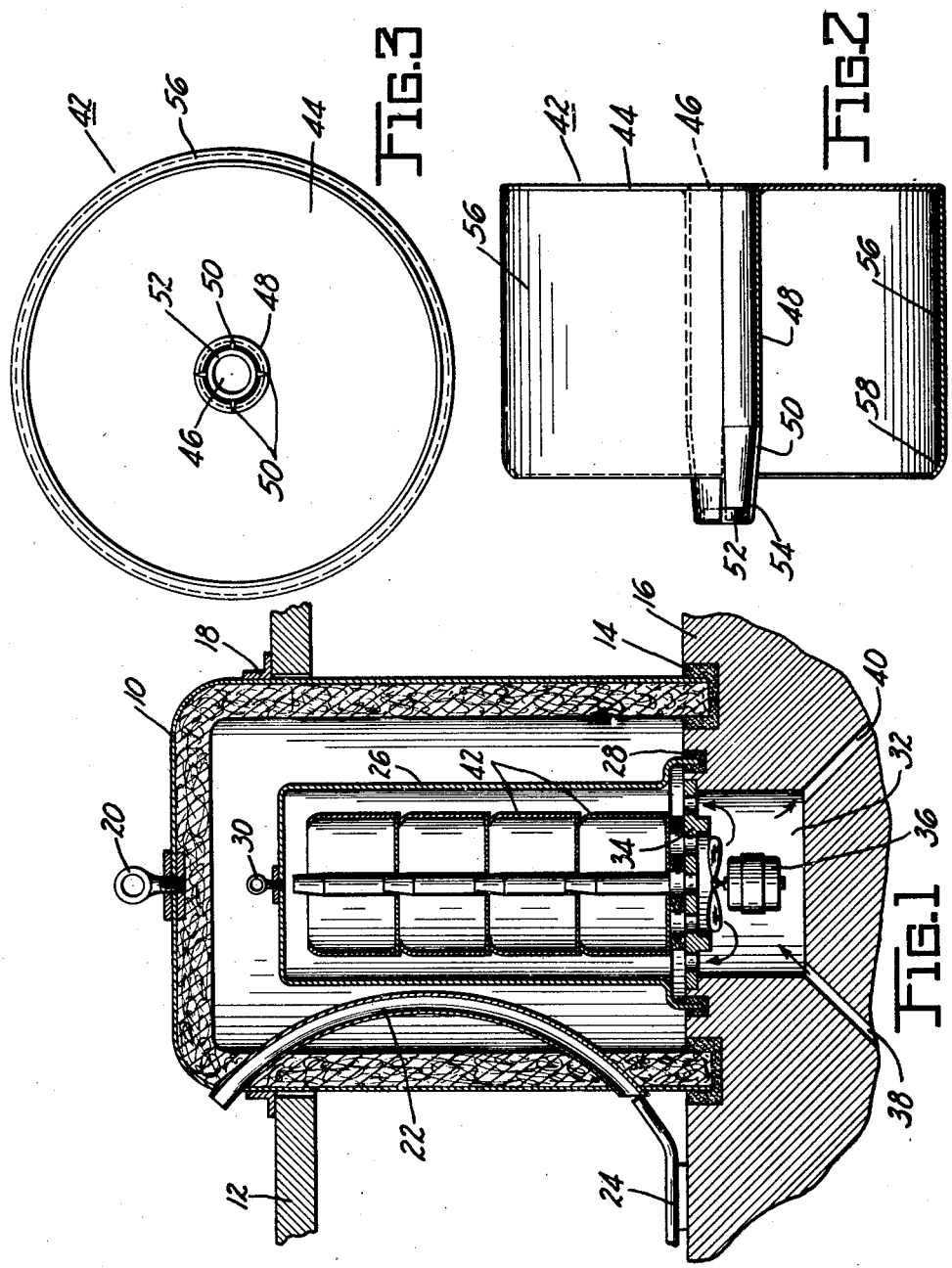
INVENTOR.
ROBERT C. PIERCE
BY
Booth & MacDuff
ATTORNEYS Feb. 16, 1943.  R. C. PIERCE  2,310,991
ANNEALING APPARATUS
Filed March 8, 1940  6 Sheets-Sheet 2
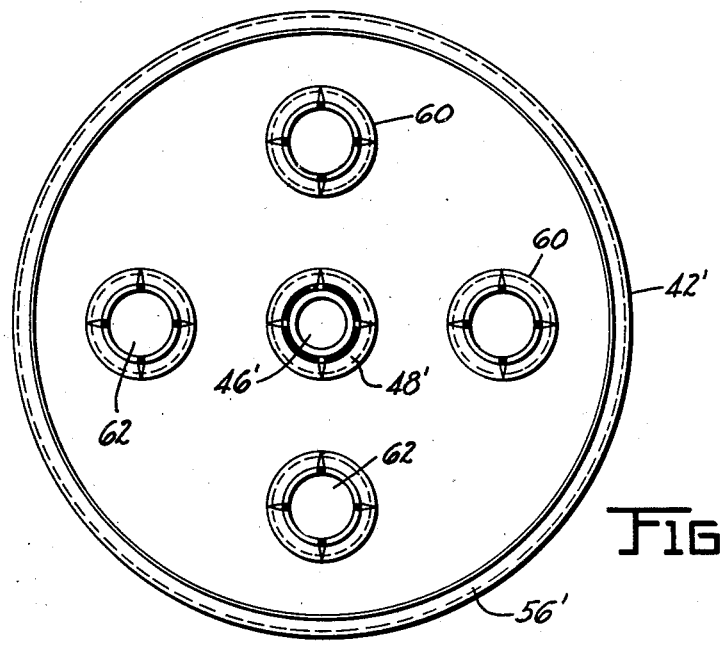
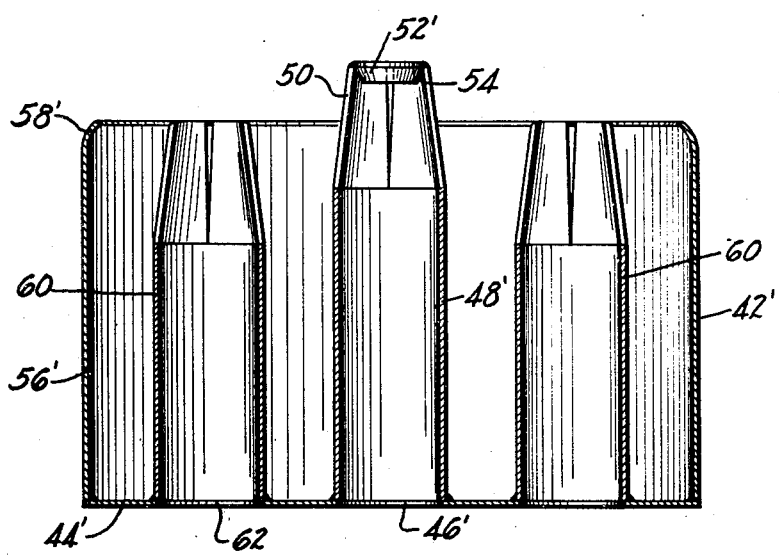
INVENTOR.
ROBERT C. PIERCE
BY
Booth & MacDuff
ATTORNEYS Feb. 16, 1943. R. C. PIERCE 2,310,991
ANNEALING APPARATUS
Filed March 8, 1940 6 Sheets-Sheet 3

INVENTOR.
ROBERT C. PIERCE
BY Booth & MacDuff
ATTORNEYS

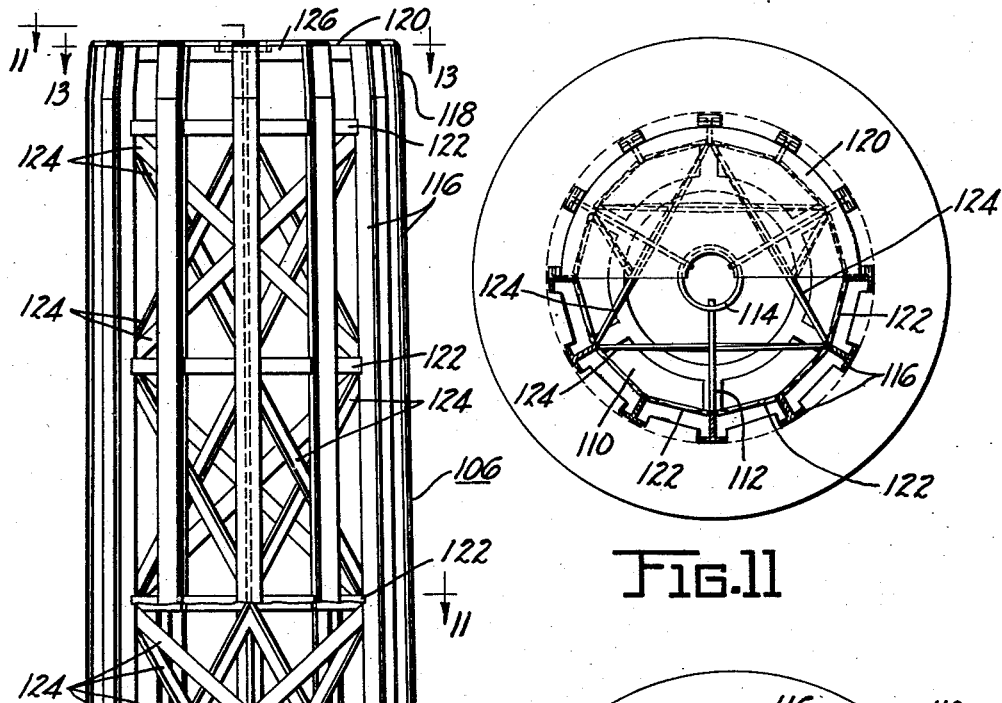
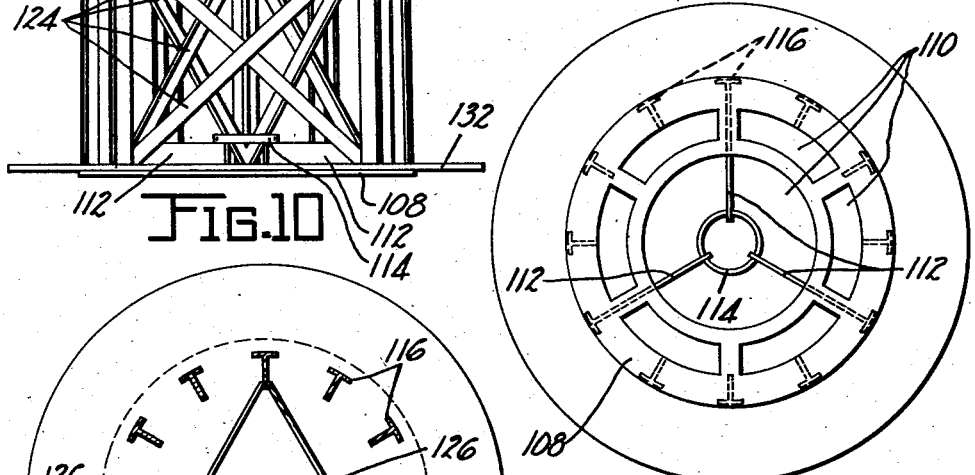
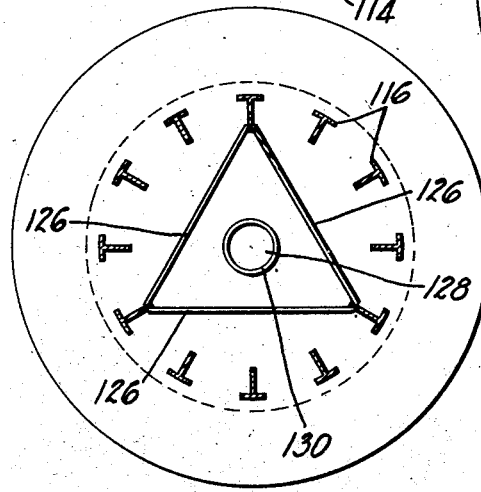

Feb. 16, 1943. R. C. PIERCE 2,310,991
ANNEALING APPARATUS
Filed March 8, 1940 6 Sheets-Sheet 5
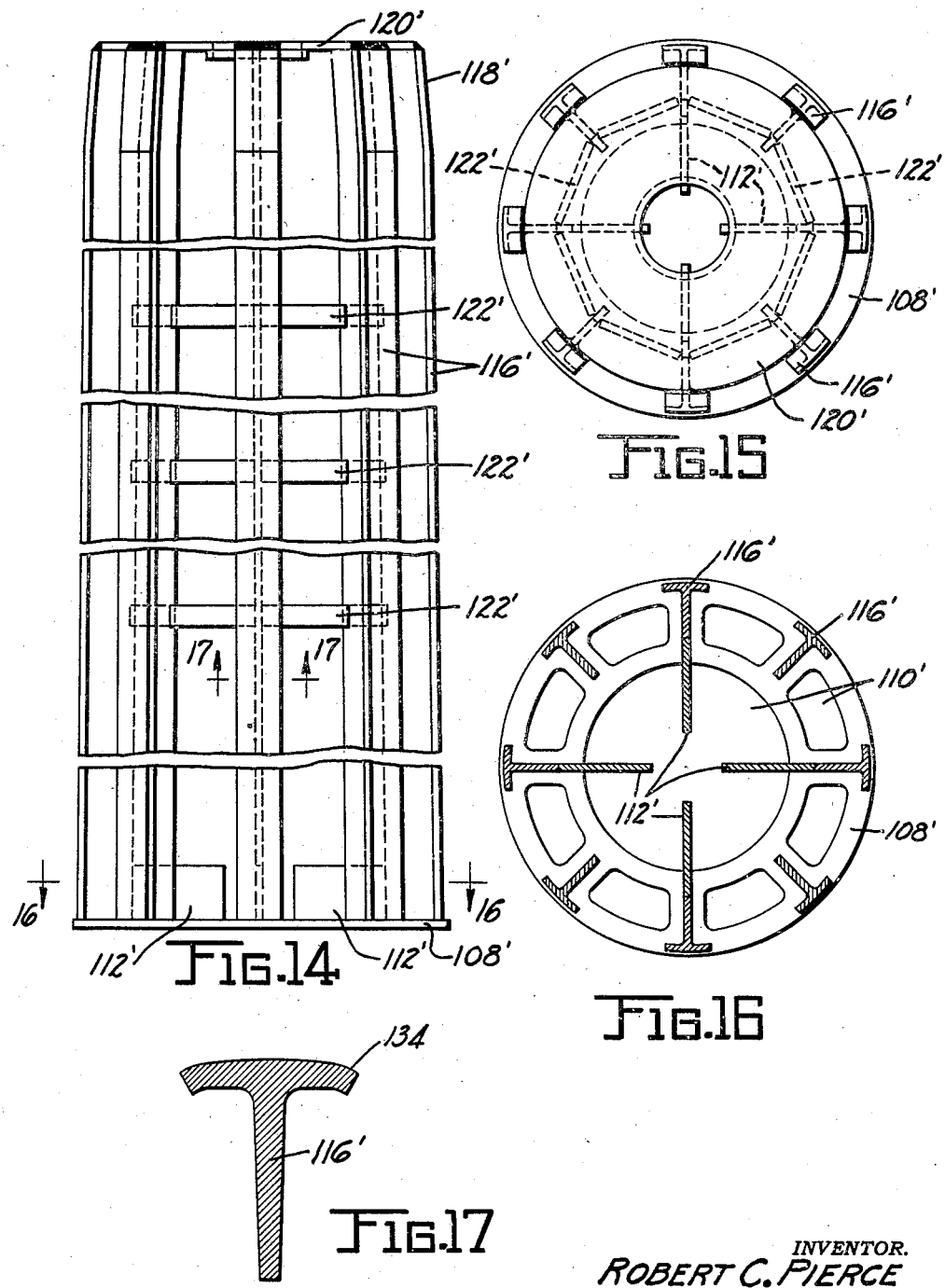
INVENTOR.
ROBERT C. PIERCE
BY
ATTORNEYS Feb. 16, 1943.  R. C. PIERCE  2,310,991
ANNEALING APPARATUS
Filed March 8, 1940  6 Sheets-Sheet 6

INVENTOR.
ROBERT C. PIERCE
BY Booth & MacDuff
ATTORNEYS

Patented Feb. 16, 1943

2,310,991

UNITED STATES PATENT OFFICE 2,310,991

ANNEALING APPARATUS

Robert C. Pierce, Niles, Mich., assignor to National Standard Company, Niles, Mich., a corporation of Michigan Application March 8, 1940, Serial No. 322,870

8 Claims. (Cl. 263—47)

This invention relates to apparatus for annealing and heat-treating coils of wire and more particularly to apparatus for handling coils of wire in and out of an annealing furnace.

An object of the invention is to provide improved apparatus which is adapted to support and protect coils of wire when placed in an annealing furnace, and which is also adapted to be easily removed from the furnace and transported to points where further operations are to be performed.

Another object of the invention is to provide wire handling apparatus for use in annealing wire, which eliminates danger of the wire being materially deformed or damaged during the annealing process.

Another object of the invention is to provide improved tubs for annealing small coils of small wire.

Another object of the invention is to provide improved stems for annealing large coils of coarse wire.

Still another object is to provide such stems and tubs with means readily engageable with a novel crane hook for lifting said stems or tubs in and out of an annealing furnace.

Another object is to provide supporting means for coils of wire in an annealing furnace, which means is adapted to promote and facilitate proper circulation of the atmosphere in the furnace in order to provide a good distribution of heat and an even temperature throughout the entire contents of the furnace.

The above and other objects and desirable particular arrangements of parts will become apparent upon reading the following detailed description of several embodiments of my invention shown in the accompanying drawings, in which:

Figure 1 is a vertical axial sectional view through one common type of annealing furnace showing my novel tubs in place;

Figure 2 is a similar section on an enlarged scale of one of my novel tubs;

Figure 3 is a plan view of said tub;

Figure 4 is a plan view of a modified form of tub;

Figure 5 is a vertical axial sectional view of the tub shown in Figure 4;

Figure 10 is a side elevational view of another form of annealing stem with parts broken away to show the internal supporting structure;

Figure 11 is a sectional view of Figure 10 taken on the lines 11—11;

Figure 12 is a bottom plan view of the stand of Figure 10;

Figure 13 is a sectional view on the line 13—13 of Figure 10;

Figure 14 is a side elevational view of the fourth form of annealing stem;

Figure 15 is a top plan view of the stem of Figure 14;

Figure 16 is a sectional view on the line 16—16 of Figure 14;

Figure 17 is an enlarged sectional view on the line 17—17 of Figure 14;

Figure 7:
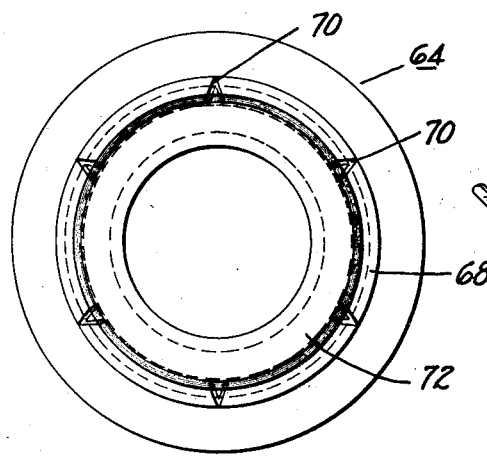
Figure 7 is a top plan view of the stem of Figure 6.

Referring now to the drawings, Figure 1 is a more or less diagrammatic representation of a common type of annealing furnace adapted for use in annealing wire. It consists, generally, of an insulated outer shell 10 in the form of an inverted cup adapted to extend downwardly through the opening in an upper floor 12 of a building, and to have its lower annular edge seated in sand in a groove 14 on the next lower floor 16 of the building. This outer shell may be provided with feet or brackets 18 adapted to support it on the upper floor 12 and is generally provided with a central ring 20 by means of which it may be lifted out by a large crane. A plurality of burner tubes 22, in a generally bowed form, project through the wall of this outer shell near the lower edge thereof, and project out of the shell near the upper end thereof. A plurality of gas burners 24, secured on the lower floor 16, are adapted to register with the said tubes, and the flame and products of combustion of said burners pass through said tubes and thereby heat the interior of said shell.

Within the outer shell 10 is an inner shell 26 of steel or cast iron. This shell is also adapted to have its lower annular edge seated in sand in a groove 28 in the floor 16, and it may also be provided with a hook 30. A recess 32 is formed in the floor 16 beneath the shell 26 and may communicate with the interior of the shell through a grill 34. A circulating fan and motor 36 are provided in this recess and are adapted to circulate a neutral atmosphere up and around the material which is to be annealed (the material is placed within the inner shell 26). The neutral atmosphere, which may be hydrogen or the like, is admitted to the chamber 32 through a passage 38. It may be withdrawn from the chamber through a second passage 40 and burned in the atmosphere or otherwise suitably disposed of.

For handling small coils of wire in such a furnace, I have provided novel tubs 42, four of which are shown in the furnace of Figure 1. I prefer to form these tubs of heavy sheet steel by welding, although other suitable methods of constructions might be employed. They comprise a flat bottom plate 44 having a central opening 46 around the edge of which is welded a substantially upstanding tube 48. The upper end of the tube may be gored as at 50, and hammered inwardly to form a tapered end. The margins of the gores are spaced apart to leave tapered holes for the circulating gas, and a ring 52 is welded in the extreme end of the stem 48. The outer lower surface of the ring 52 may be chamfered, as shown at 54, for the receipt of my novel crane hook. A cylindrical side wall 56 is welded to the outer periphery of the bottom plate 44 and extends to a height somewhat less than the height of the central stem 48. A portion of the wall 56 adjacent its upper annular edge is rolled inwardly at 58 for a purpose to be described. The upper end of the central tube or stem 48 is tapered sufficiently so that when a plurality of tubs 42 are superimposed upon each other the projecting end of the stem 48 fits snugly into the opening 46 with the next tub. The rolled in portion 56 of the side walls provides adequate support for the bottom plate of the next tub.

In use, coils of wire may be slipped over the central stem, and then other coils may be stacked around the annular space between the stem and the outer walls 56. If larger coils are to be annealed, it may be desirable not to place any over the central stem, but only to stack them around said annular space. Using my novel hook, which will be described later, a plurality of filled tubs are stacked upon the grill 34 of the annealing furnace. The shells 26 and 10 are lowered in place and the annealing process is carried out in the usual manner. Upon its completion, the shells 10 and 26 are removed and the tubs are lifted out and transported to the scene of the next operation by a travelling crane or suitable trucks.

An important advantage of my novel tubs, over and above the ease with which they may be handled and securely stacked, resides in the fact that the central stems 48 form a chimney facilitating circulating of the atmosphere within the shell 26 and resuling in the more even distribution of the heat and the consequent more exact carrying out of the annealing process.

The modified form of tub in Figures 4 and 5 is similar in construction to that of Figures 2 and 3, and the same reference numerals, primed, are applied to similar parts. This tub is modified by the provision of a plurality of additional stems 60 equally spaced in annular array around the central stem. These stems are, however, no higher than the height of the wall 56' but they are formed with the taper similar to that of the central stem 48' to facilitate placing coils of wire over them. Each of the stems 60 is welded around the periphery of an opening 62 in the bottom plate 44' so that, if care is exercised in stacking these tubs in the furnaces so as to place the stems 60 in registry a large number of circulating chimneys are formed, providing more even distribution of heat. These tubs are used in the same manner as those previously described, and are particularly adapted for use with larger coils of wire having a central opening at least slightly larger than the stems 60.

Figure 6:
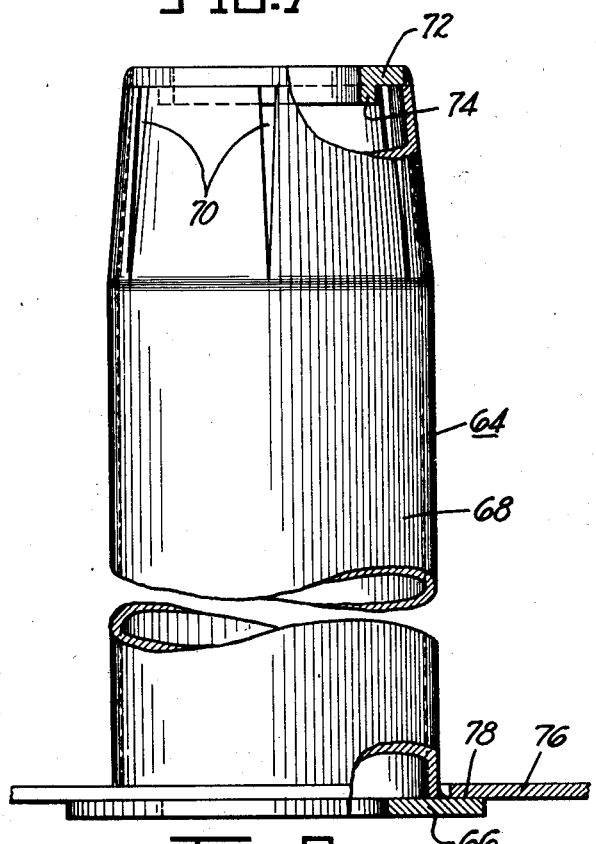
Figure 6 is a side elevational view with parts in section showing one of my novel annealing stems.

For coils of wire too large to be placed in the tubs 42 or 42' I provide a stem only, adapted to have several coils stacked over it. These stems are made substantially as long as the chamber inclosed by the shell 26 of the annealing furnace. Figure 6 shows one simple form of such stems designated, generally, by the numeral 64. It comprises a bottom plate 66 in the form of a ring to which is welded a tube 68. The upper portion of the tube 68 is gored at 70, hammered in and welded to form a taper as previously described. A top plate 72, also formed as a ring, has its outer periphery welded to the upper annular edge of the tube 68, and may be formed around its inner periphery with a downwardly turned flange 74 for engagement with my novel crane hooks. One method of forming the flange 74 is to weld a narrow ring to the top plate 72. A ring-formed plate 76 is generally placed around the tube 68 so as to rest on the abutment 78 formed by the outermost portion of the bottom plate 66. The plate 76 forms a platform upon which the lowermost coil rests when the stem is in use, and also acts as a stripper plate when coils are removed from my novel stem by means of my novel loading and unloading machine disclosed and claimed in my application Serial No. 228,283 filed September 3, 1938. That is, the stripper plate 76 shown herein in Figure 6, for example, has the same function as plate 10 shown in Figure 7 of application 228,283.

In use, coils of wire are stacked around the stem with the lowermost coils resting upon the plate 76. The height to which they are stacked is limited to the point where the lowermost coil will not be unduly crushed and deformed by the pressure of those rested upon it when it is heated to the annealing temperature. Using one of my novel hooks, the stem 64 with its load of coils is lifted by means of a crane and placed in the annealing furnace as previously described relative to the tubes 42 and 42'.

Figure 8:
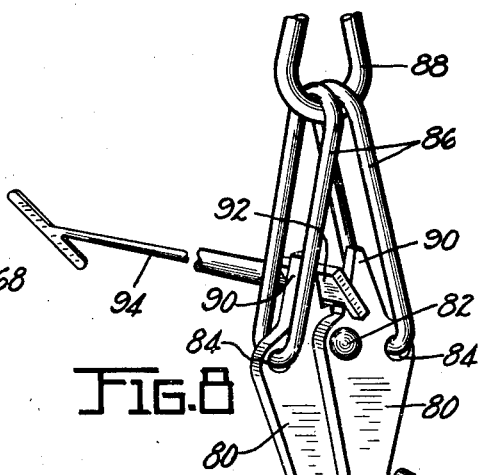
Figure 8 is a perspective view of a novel crane hook adapted for use in handling my novel tubs and stems.

One form of my novel hooks, shown in Figure 8, may comprise two similarly shaped hook members 80 pivoted to each other at 82 so that the hooks are disposed in outwardly facing opposite arrangement. Each of the hook elements 80 may be formed with an opening 84, spaced outwardly from the pivot 82, into which is secured an elongated chain link 86. The chain links are joined by means of a ring 88 adapted to be carried by a crane hook of normal type. Each of the hook elements 80 may be formed adjacent the pivot 82 with an upstanding ear 90 between which may be placed a flattened key element 92 to which is secured a long handle 94. This hook is particularly adapted to handle the annealing stems, such as 64, upon which the coils of wire may be of such large diameter that it is difficult for a workman to reach to the center of the stem in order to insert the hook into the opening in the top plate thereof. In order to use this hook it is only necessary to turn the key element 92 by means of the handle 94 to separate the ears 90 and thereby swing the hook elements inwardly toward each other so that they may be lowered through the opening in the top of the stem. The key is then turned to a vertical position permitting the ears 90 to move toward each other and the hook elements to move apart so that when the chain is raised the hooks engage the flange 74. An important advantage of this novel arrangement of hook and elements adapted to receive it resides in the fact that the upper end surfaces of the stems are left substantially smooth and flat so as not to interfere with or catch the coils of wire as they are slid on and off, particularly when the stems are loaded and unloaded by means of my novel machine mentioned above. My novel devices here described enable the stands to be lifted and lowered in exact vertical alignment. This is also a desired advantage where it is necessary to lower them through openings in the floor and the like.

Figure 9:
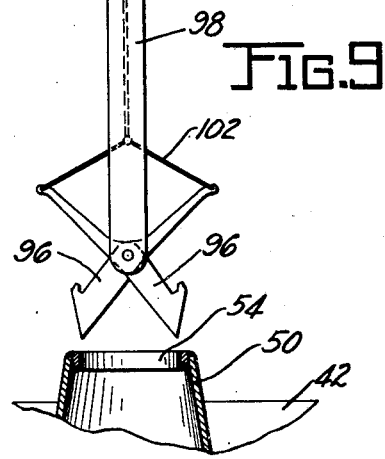
Figure 9 is a side elevational view of a modified form of hook.

Another form of hook is shown in Figure 9. This hook comprises two hook elements 96, which are pivoted near their centers, to a rod 98. The rod 98 may be preferably built up of two or more iron straps and is formed adjacent its lower end, where the hooks are attached, as a yoke with the hook elements placed between the arms thereof. The upper end of the rod 98 may be formed as a ring 100 adapted to receive an ordinary crane hook. The upper ends of the hook elements are loosely innerconnected by means of a chain 102 to the center of which is secured another chain 104, which may extend upwardly along the rod 98, and may pass through the ring 100 to be conveniently grasped by an operator or by some instrument operated by a workman, so that it may be pulled to draw the hook elements together so that they may be inserted into the opening in the ends of stems 48 of tubs 42 or the like, and hooked underneath the flanges 54. This type of hook is particularly adapted to enable a workman on the floor 12 to pick up the lower tubs resting on the grill 34 of the annealing furnace. Certain annealing furnaces are made with only the upper ends removable, and a hook of this character is desirable for handling tubs in such a furnace.

For very large coils of wire, a stem of the construction shown in Figures 6 and 7 would necessitate the handling of a lot of dead weight, and therefore, I have devised several forms of skeleton construction of stems shown in Figures 10 to 22, inclusive, adapted for use with such large coils of wire, and having ample strength to withstand the high temperatures and heavy loads to which they are subjected. One of these stems, shown in Figures 10 to 13, inclusive, may be designated generally by the reference numeral 106. It may comprise a base plate or ring 108. This plate may be skeletonized for saving weight and better circulation of the atmosphere within the furnace, by cutting out openings, such as 110 (see Figure 12). Three or more radically extending vertical ribs 112 may be welded to the upper face of this ring and their inner ends may be joined to the periphery of a small steel ring 114. The small ring 114 and ribs 112 form centering means cooperating with the tapered members 36 shown in Figure 7 of my application No. 228,283, referred to above, covering the unloading machine. A plurality of iron bars 116, preferably of T-section, have their lower ends welded to the upper face of the ring 108 and extend vertically therefrom to form ribs or staves of a barrel-like structure comprising the stem. I prefer to use a considerable number, for example twelve, such bars equally spaced about the periphery of the ring 108 and having their flanges facing outwardly.

The upper ends of the T-irons 116 may be bent inwardly somewhat to form a cone-shaped portion at the upper end of the stem as shown at 118, and the upper ends of the irons are welded to the outer margin of a top plate or ring 120. At spaced intervals along the lengths of the irons 116, each iron may be joined to its adjacent one by strips of strap iron 122 extending between the edges of the webs of the T's. The strips of iron 122 at each interval form an annular ring dividing the stem lengthwise into a plurality of bays.

Each of these bays is diagonally cross-braced by a plurality of iron elements 124. In the illustrated design, there are six such elements arranged in crossed pairs, and with the pairs arranged in planes cutting chords of the reinforcing rings to form a triangle with the corners of the triangle welded to the legs of the three of the T-irons which are spaced 120° apart. In the next succeeding bay the T-irons to which the cross bracing is secured are those which are spaced 60° from those employed in the first bay while in the third bay (there being only three in the illustrated stem) the bracing extends between the original set of three irons. The top plate 120 may be braced by three ribs 126 arranged in the form of a triangle and welded to the lower face of the said plate. It is formed with a central opening 128 surrounded by a downwardly extending flange 130 similar to that shown in the stand 64 previously described. The upper plate 120 is not necessarily perforated but the inward tapering of the upper end of the stem provides adequate clearance to that the circulating atmosphere may pass radially outwardly between the staves 116. This stem is also provided with a movable stripper plate 132, and according to one feature of my invention I form the margin of the opening in this plate with notches interfitting with the staves 116 and forming tongues extending between the staves, as shown in Figure 11.

Another important feature of the construction of this device resides in the fact that the flanges of the T-irons have their edges rolled sharply inwardly as shown at 134, in Figure 17. This construction eliminates a tendency which would otherwise exist for the inner wires of a coil to be severed as the coil is stripped off the stem.

An intermediate size of stem is illustrated in Figures 14 to 17, inclusive, and its structure is generally similar to that of the stem of Figures 10 to 13 inclusive, with the exception that the cross bracing, formed by the iron straps 124, is eliminated due to the fact that smaller loads are imposed by the lighter coils of wire. Reference numerals employed in these figures are the same as those used in referring to Figures 10 to 13, inclusive, with the addition of the prime mark and it is thought to be unnecessary to describe it further. It may be noted, however, that the number of bars 116' has been reduced to 8.

Figures 18 to 22, inclusive, show another modification comprising a skeletonized base plate 136 braced by four vertical radial ribs 138 and having staves formed of I-beams in place of the T-irons used in the modifications previously described. The upper ends of the I-beams 140 have their webs gored just beneath the outer cross member thereof and said outer cross member is bent inwardly as at 142 and welded to the web to form the desired cone at the upper end of the stem. The usual top plate 144 is provided at the upper end of the stem and is braced with the triangular arranged ribs 146 as described in connection with Figure 10. The top plate 144 is also provided with a central opening 148 surrounded by a downwardly extending flange 150 adapted to receive my novel hooks. Within the inclosure formed by the staves 140 is placed a cone-shaped element 152 formed of light sheet metal. At the top plate 144 its diameter is as large as permitted by the available space and it tapers downwardly gradually to a point adjacent the base plate 136 where it is closed by a blunt cone-shaped element. At spaced intervals along the length of the stem this cone-shaped element is closely surrounded by heavy reinforcing rings 154. From each of these rings 154 pairs of steel strips 156 extend symmetrically and radially to some of the I-beams 140 and are welded to the inner cross member thereof. In the illustrated embodiment four such sets of reinforcing elements 156 are provided at each ring.

Figure 18:
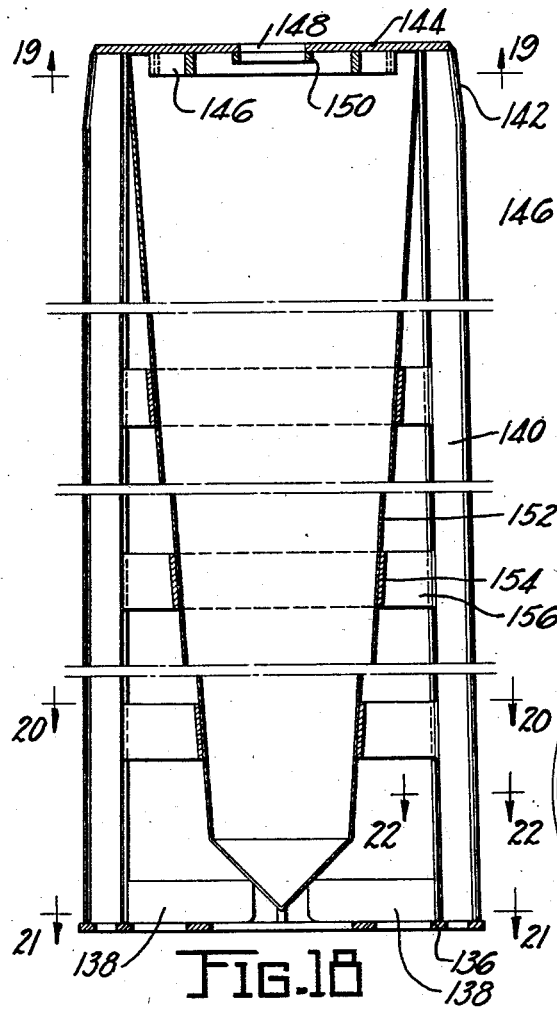
Figure 18 is a vertical axial sectional view of still another form of annealing stem.
Figure 19:
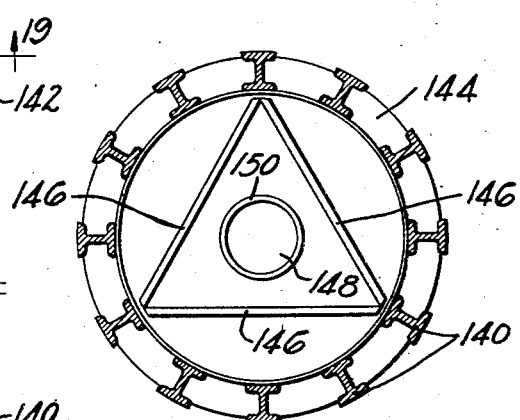
Figure 19 is a sectional view taken on the line 19—19 of Figure 18.
Figure 20:
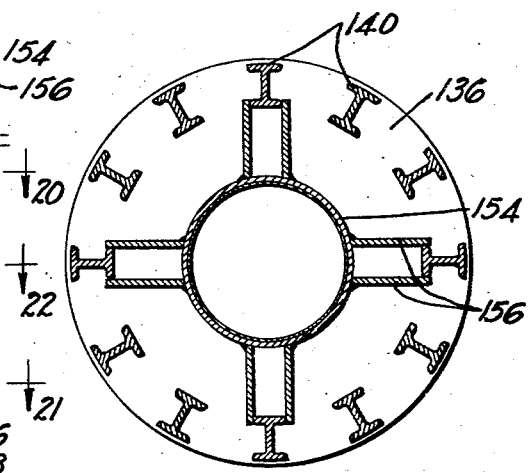
Figure 20 is a sectional view taken on the line 20—20 of Figure 18.
Figure 21:
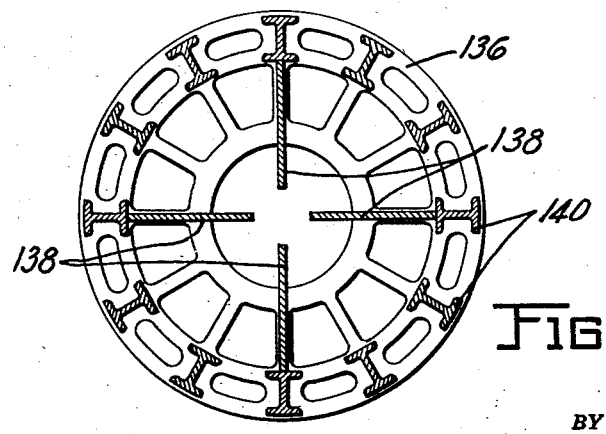
Figure 21 is a sectional view taken on the line 21—21 of Figure 18.
Figure 22:
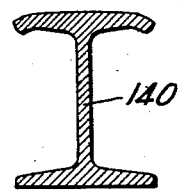
Figure 22 is an enlarged sectional view taken on the line 22—22 of Figure 18.

As shown in Figure 18, the outer cross member of the I-beam 140 has its longitudinal edges rolled inwardly as shown at 142 in the same manner as was previously described in connection with the modification of Figure 10. A stripper plate would be employed with this device, but is not shown.

While several embodiments of my invention have been shown and described in detail it is not my intention that the scope of the invention should be limited to those embodiments or otherwise than by the terms of the appended claims.

What is claimed is:

1. In wire annealing apparatus a wire carrying device comprising a tub with a flat bottom, a vertical cylindrical side wall, a central vertically extending stem, and a plurality of generally similar stems in annular array between the central stem and the side wall.

2. In wire annealing apparatus a wire carrying device comprising a tub with a flat bottom, a vertical cylindrical side wall, a central vertically extending stem, and a plurality of generally similar stems in annular array between the central stem and the side wall, said stems being hollow and open at both ends.

3. In wire annealing apparatus a wire carrying device comprising a tub with a flat bottom, vertical cylindrical side walls, and a central vertical stem extending above the top of the side walls and having its upper end tapered and being hollow at both ends to telescopically receive the stems of similar tubs when stacked in vertical rows.

4. In wire annealing apparatus a wire carrying device comprising a tub with a flat bottom, vertical cylindrical side walls, a central vertical hollow stem having one end projecting above the side walls and tapered to telescopically fit into the lower end of the stem of a similar tub when a plurality of tubs are stacked in vertical rows.

5. In wire annealing apparatus a wire carrying device comprising a tub with a flat bottom, vertical cylindrical side walls, a central vertical hollow stem having one end projecting above the side walls and tapered to telescopically fit into the lower end of the stem of a similar tub when a plurality of tubs are stacked in vertical rows, said side walls having their upper edges offset inwardly to facilitate stacking.

6. In wire annealing apparatus a wire carrying device comprising a tub with a flat bottom, vertical cylindrical side walls, a central vertical hollow stem having one end projecting above the side walls and tapered to telescopically fit into the lower end of the stem of a similar tub when a plurality of tubs are stacked in vertical rows, said one end of the stem having inwardly and downwardly extending flanges adapted to receive a lifting and transporting device.

7. In wire annealing apparatus, a wire carrying device comprising a hollow vertical stem, a flat plate member around the stem at the lower end thereof to support a coil of wire around the stem, the upper end of the stem being tapered to provide a truncated conical upper portion, and an annular ring secured to the interior of the stem at the top thereof, and providing a downwardly extending annular flange spaced inwardly from the stem walls to receive hooks for lifting and transporting the device.

8. In wire annealing apparatus, a wire carrying device comprising a vertical cylindrical stem gored at its upper end and tapered inwardly to form a truncated conical top, an annular ring secured to the inner surface of the stem at the top and providing a downwardly extending annular flange spaced inwardly from the stem walls to receive hooks for lifting and transporting the device, and a flat plate member around the stem at the lower end thereof to support a coil of wire around the stem.

ROBERT C. PIERCE.